Figure 1:
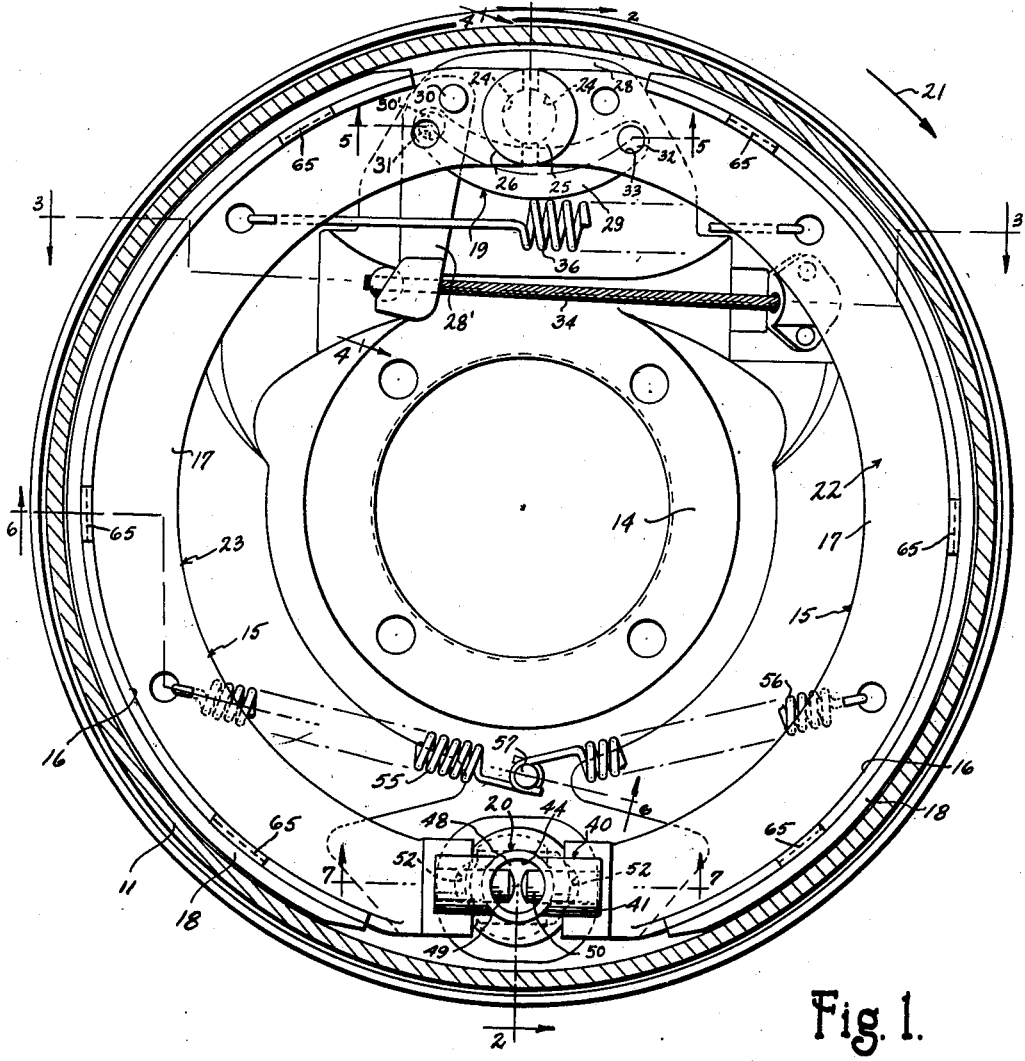
Figure 3:
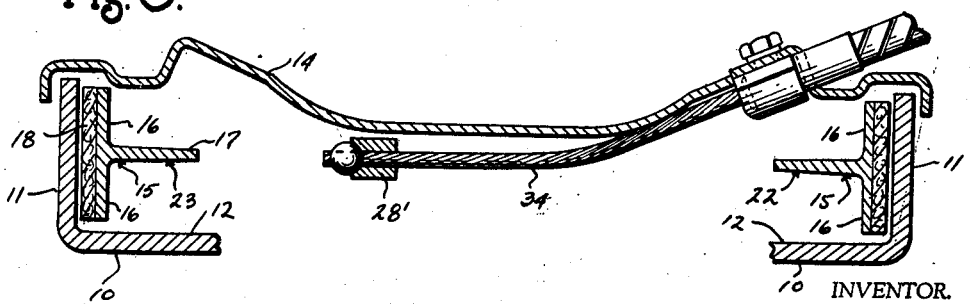
Figure 5:
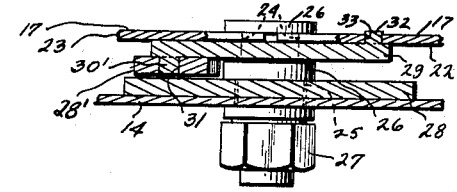
Figure 4:
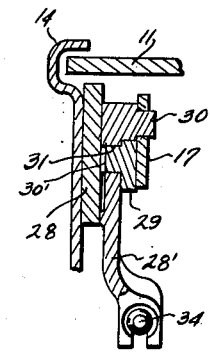

INVENTOR.
Frank L. Main

March 19, 1940.　　　F. L. MAIN　　　2,193,975

BRAKE MECHANISM

Filed July 28, 1937　　　2 Sheets-Sheet 2

INVENTOR.
Frank L. Main
BY Whittemore Hulbert & Belknap
ATTORNEYS

Patented Mar. 19, 1940

2,193,975

UNITED STATES PATENT OFFICE 2,193,975

BRAKE MECHANISM

Frank L. Main, Birmingham, Mich., assignor to Kelsey-Hayes Wheel Company, Detroit, Mich., a corporation of Delaware Application July 28, 1937, Serial No. 156,220

7 Claims. (Cl. 188—78)

This invention relates generally to brake mechanisms and refers more particularly to improvements in brake constructions of the type employed in association with the wheels of motor vehicles.

It is one of the principal objects of this invention to appreciably increase the braking effectiveness under all conditions of operation with brake mechanism composed of a relatively few simple parts capable of being inexpensively manufactured, assembled, and installed.

Another object of this invention is to provide a smooth operating brake having a relatively light pedal pressure and, at the same time, eliminating any tendency for the brake to grab or lock up when rapid deceleration is effected at slow speed.

Another advantageous feature of this invention consists in the provision of brake mechanism of the lever operating type where the leverage remains substantially constant throughout brake application and wherein adjustment of the friction means relative to the brake flange of the drum does not appreciably change the released position of the end of the lever connected to the operator. As a result of this arrangement, the brake friction means may be adjusted without effecting a corresponding adjustment of the connection between the operating lever and the operator.

Still another object of the present invention resides in the provision of leverage means for operating the brake friction means rendering it possible to secure the leverage required for satisfactory brake operation with a lever arm sufficiently short to permit extending the cable or other connection from the arm to the operator between the axle and abutment for the actuator ends of the friction means.

A further advantageous feature of the present invention resides in the provision of brake actuating mechanism of the character set forth wherein the leverage is lower when the brake drum is rotating in the reverse direction with the result that a single retraction spring will suffice to effectively return the lever and brake cable to their released position.

A still further object of the present invention resides in the novel means provided herein for adjusting the brake friction means relative to the brake flange. In accordance with this invention, the adjustment mechanism is supported between the ends of the friction means opposite the actuator ends of the latter for limited movement circumferentially of the drum to provide for the transfer of torque from the primary shoe to the secondary shoe when the drum is rotating in one direction.

In addition to the foregoing, the present invention contemplates adjustment mechanism having an adjusting screw threaded in the bracket of the adjustment device and cooperating with means on the bracket to indicate predetermined increments of adjustment and to prevent accidental rotation of the screw.

A further object of this invention resides in the provision of friction means having means engageable with the backing plate to laterally locate the friction means in the drum and adapted to be maintained into engagement with the backing plate by means of suitable retraction springs for the friction means.

The present invention also contemplates brake mechanism wherein the adjustment device is prevented from shifting movement in the reverse direction of rotation of the brake drum so that when the friction means is applied in this direction of rotation, there is no torque transferred through the adjustment device.

The foregoing, as well as other objects, will be made more apparent as this description proceeds, especially when considered in connection with the accompanying drawings, wherein:

Figure 1 is a side elevational view of a brake drum equipped with brake mechanism constructed in accordance with this invention;

Figures 2, 3, 4, 5, 6, and 7 are sectional views taken substantially on the planes indicated by the lines 2—2, 3—3, 4—4, 5—5, 6—6, and 7—7 of Figure 1.

The brake selected for the purpose of illustrating the present invention is provided with a brake drum 10 having an annular axially extending brake flange 11 and having a web 12 centrally apertured, as at 13, to provide for the passage of the wheel supporting axle or spindle therethrough. In accordance with conventional practice, the rear side of the brake drum is closed by a backing plate 14 fixed in any suitable manner against rotation with the drum and adapted to support the brake mechanism including the brake friction means 15 within the brake drum.

In the present instance, the brake friction means 15 comprises a pair of shoes substantially T-shaped in cross section having axially extending portions 16 and having radially inwardly extending web portions 17. The axially extending portions 16 are located adjacent the inner annular surface of the brake flange 11 and a brake lining 18 having the desired coefficient of friction is secured to the outer surfaces of the axially extending portions 16 of the shoes for engagement with the inner annular surface of the brake flange 11. The brake shoes are supported within the brake drum with the opposite ends thereof spaced from each other circumferentially of the drum and are preferably interchangeable to facilitate assembly.

Upon reference to Figure 1, it will be noted that an actuator 19 is associated with the spaced ends of the shoes at one side of the drum for expanding the shoes against the brake flange and an adjustment anchor device 20 is located between the opposite ends of the shoes for the purpose of varying the clearance between the shoes and brake flange. With this construction, and assuming that the forward direction of rotation of the drum is indicated by the reference character 21 in Figure 1, it will be noted that the shoe 22 is the leading or primary shoe and the shoe 23 is the trailing or secondary shoe.

The actuator ends of the shoes are provided with registering recesses 24 cooperating with each other to receive a shouldered pin 25 forming an abutment for the shoes in their released positions. Upon reference to Figure 2, it will be noted that the recessed ends 24 of the shoes engage the abutment between a pair of axially spaced shoulders 26 cooperating with each other to prevent axial displacement of the actuator ends of the shoes. It will also be observed from Figure 2 that the pin or stud 25 is secured to the backing plate by means of a nut 27 and that the latter cooperates with the rear shoulder 26 to clamp a reinforcing plate 28 against the inner side of the backing plate. The plate 28 is welded or otherwise secured to the backing plate and prevents localizing the stresses resulting from the brake torque on the backing plate at the stud 25.

As will be more fully hereinafter set forth, the adjustment anchor device 20 is so constructed as to permit limited circumferential movement of the brake shoes in the forward direction of rotation indicated by the reference character 21 in Figure 1 and the actuating mechanism 19 is carried by the brake shoes for floating movement therewith. In detail, the actuating mechanism comprises a lever 28' and a link 29 arranged to establish an operative connection between the recessed ends 24 of the brake shoes. The lever 28' is fulcrumed, as at 30, upon the actuator end of the secondary shoe in close proximity to the drum diameter and is connected to the actuator end of the primary shoe by means of the link 29 having a projection 30' pivotally engaging within an opening 31 formed in the lever 28' adjacent the fulcrum 30. The opposite end of the link is provided with a projection 32 pivotally engaging within an opening 33 through the actuator end of the primary shoe 22. The radially inner end of the lever 28' is operatively connected to a linear member, such as a cable 34, and the latter extends through the backing plate 14 for connection to a suitable operating control member (not shown).

It will be noted from Figure 1 that when a pull is exerted on the cable 34 in the forward direction of rotation of the brake drum, the lever 28' fulcrums about the point 30 and causes the projection 30' or link 29 to move toward the primary shoe. This movement of the brake operating linkage causes the actuator end of the primary shoe to move outwardly into engagement with the brake flange 11 against the action of the retracting spring 36 interconnecting the actuator ends of the shoes below the link 29. In view of the fact that the pull on the cable is applied in a direction away from the secondary shoe and toward the primary shoe, it follows that the actuator end of the secondary shoe is maintained into engagement with the stud 25. As a consequence, any noise resulting from the tendency of the servo to snap the actuator end of the secondary shoe into engagement with the abutment is prevented. Inasmuch as the distance between the two pivot points 30 and 30' on the lever is relatively slight as compared to the distance between the pivot point or fulcrum 30 and the connection of the cable 34 with the radially inner end of the lever, it follows that the proper operating leverage may be secured with a relatively short lever. As a matter of fact, the lever 28' may be so short that when the fulcrumed point 30 is positioned in close proximity to the drum diameter, the radially inner end of the lever assumes a position permitting the cable to be extended between the abutment 25 and the opening 13 through the backing plate for the axle or spindle of the wheel (not shown). As a consequence, a saving is not only effected by virtue of the minimum amount of material required, but more positive brake operation results because lost motion is appreciably minimized. Referring again to Figure 1 of the drawings, attention is called to the fact that in order to locate the pivots 30 and 30' in close proximity to the drum diameter, the link 29 is actually arcuate in configuration so as to extend around the abutment 25. In actual practice, sufficient axial space is provided between the front side of the rear shoulder 26 on the abutment 25 and the adjacent surfaces of the webs of the brake shoes to permit extending the link 29 through this space.

It has previously been stated that the leverage of the brake operating linkage 19 remains substantially constant throughout brake application. In this connection, it will be observed from Figure 1 that the pivot centers of the brake actuating linkage are so arranged that the line of actuation of the two shoes forms substantially a chord of an arc connecting the peripheral portions of the actuator ends of the shoes and does not change sufficiently during movement of the shoes into engagement with the brake flange to effect any appreciable variation in the leverage. Also, the pivots 30' and 32 and the radially inner end of the lever 28' are located in such close relation to the stud 25 that when the shoes are moved outwardly about the stud by the adjustment anchor device 20, any movement of the radially inner end of the lever 28' is not sufficient to require varying the length of the cable 34.

Assuming now that the drum is rotating in the reverse direction, it will be noted that the operating leverage of the brake actuating linkage becomes less as soon as the shoes initially engage the brake flange. This is due to the fact that as soon as the actuator end of the shoe 22 engages the brake flange of the drum, a reactive force is transferred to the fulcrum 30' through the link 29 causing the lever 28' to pivot about the point 30' instead of the point 30. As a consequence, the long lever arm is reduced by an amount equal to the distance between the two pivots 30 and 30', with the result that the leverage will be correspondingly reduced. This construction offers the possibility of utilizing one retraction spring between the actuator ends of the shoes to return the latter into engagement with the abutment.

The adjustment device 20 comprises an anchor bracket 40 having a portion 41 located within the brake drum and having a portion 42 extending through an enlarged opening 43 in the backing plate. Upon reference to Figure 7, it will be noted that the anchor bracket is also formed with an axially extending bore 44 therethrough threaded, as at 45, to adjustably receive the screw 46. The rear end of the screw extends beyond the portion 42 of the bracket for engagement with a suitable wrench, and the forward end of the screw is provided with a conical portion 48 adapted to extend between a pair of plungers 49 and 50. The plungers are slidably supported in a bore 51 formed in the portion 41 of the bracket and extending at right angles to the bore 44. The adjacent ends of the plungers are semi-spherical for engagement with the conical surface of the adjusting screw and the outer ends of the plungers are similarly shaped to engage the ends of the brake shoes. It will be observed from Figures 1 and 7 that the adjustment ends of the shoes extend into the opposite ends of the bore 51 and are formed with semi-circular recesses 52 for receiving the spherical outer end portions of the plungers 49 and 50. More particularly in Figure 7 of the drawings, the bottoms of the recesses 52 for engaging the spherical outer ends of the plungers are transversely curved and the latter ends of the plungers are flattened, as at 54, to provide for centering the shoes on the plungers. As a matter of fact, the adjacent inner spherical ends of the plungers are also flattened so that the latter will be interchangeable end for end and thereby expedite assembly.

The adjustment ends of the shoes are maintained into engagement with the plungers and the latter are yieldably urged into engagement with the conical end 48 of the screw 46 by means of the retraction springs 55 and 56. The outer ends of the springs are respectively connected to the secondary and primary shoes and the inner ends of the springs are connected to a pin 57 secured to the backing plate. With the above construction, it will be noted that axial adjustment of the screw 46 in a forward direction causes the plungers to move outwardly in the bore 51 and this action, in turn, effects outward swinging movement of the shoes about the abutment 25. In actual practice, adjustment is effected by manipulating the screw 46 until the friction surfaces of the brake shoes are in engagement with the brake flange and then the screw is backed off the extent required to secure the proper clearance between the shoes and brake flange.

In the present instance, accidental movement of the screw 46 is prevented by means of a spring pressed detent 58 supported in a recess in the screw for sliding movement perpendicular to the axis of the screw and normally urged to its outermost position by means of a spring 59 located in the recess. The outer end of the detent is adapted to successively engage in recesses 60 extending axially of the bore 44 in circumferential spaced relationship. With this construction, accidental rotation of the screw is yieldably resisted and predetermined increments of adjustment of the screw are indicated by the clicks produced by successive engagement of the outer end of the detent in the recesses 60. It may be pointed out at this time that when the screw is assembled with the bracket, the detent is merely held in position until the same is engaged by the portion of the bracket at the rear end of the bore 44, whereupon the detent is automatically held in the screw and threading of the latter into the bracket may be continued.

It has previously been stated that the adjustment anchor device 20 allows limited circumferential shifting movement of the shoes in the forward direction of rotation of the drum and this is accomplished by forming the opening 43 in the backing plate sufficiently larger than the portion of the bracket extending therethrough to permit the desired movement. In actual practice, the opening 43 is so dimensioned that the adjustment anchor device is also capable of sufficient radial movement relative to the backing plate to compensate for drum expansion produced by the heat generated when the brakes are applied.

The bracket is held from axial displacement relative to the backing plate by means of diametrically opposed shoulders 62 arranged to cooperate with the portion 41 of the bracket to receive the portions of the backing plate surrounding the opening 43 therethrough. As shown in Figure 1, the opening 43 is formed to provide radial extensions at diametrically opposite sides of sufficient dimension to receive the shoulders 62 when the bracket is in a position 90° from the position shown in Figure 1. The bracket is held in this latter position during assembly and is then rotated to the position shown in Figure 1 wherein the shoulders assume positions at the rear side of the backing plate in the manner shown in Figure 2.

In the released position of the brake, the bracket is engaged with the side of the opening 43 facing the direction of forward rotation of the brake drum and is maintained in this engagement by the spring 55 which exerts a greater pull on the secondary shoe than the spring 56 exerts on the primary shoe, due to the fact that the pin 57 is offset from the vertical center line of the brake drum in the direction of the primary shoe.

Figure 6:
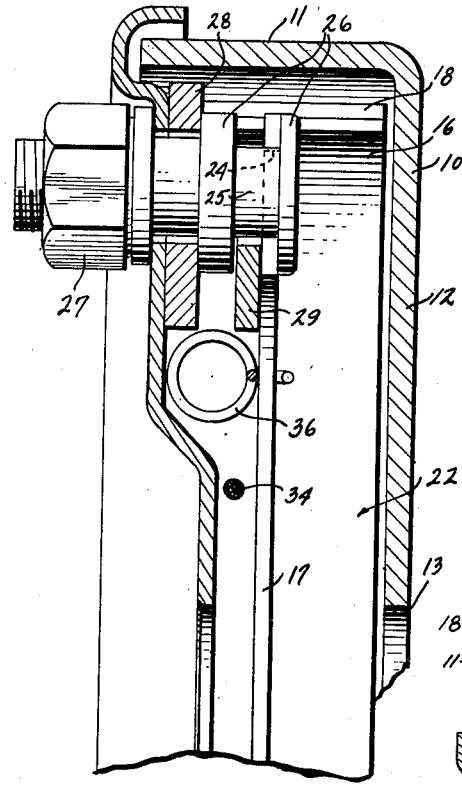
Figure 7:
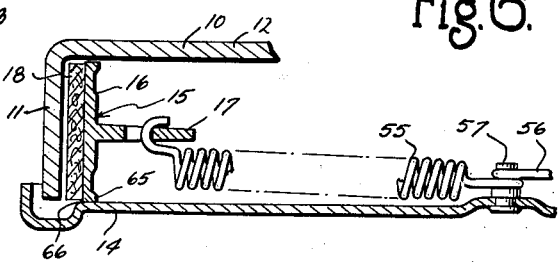
Figure 7:
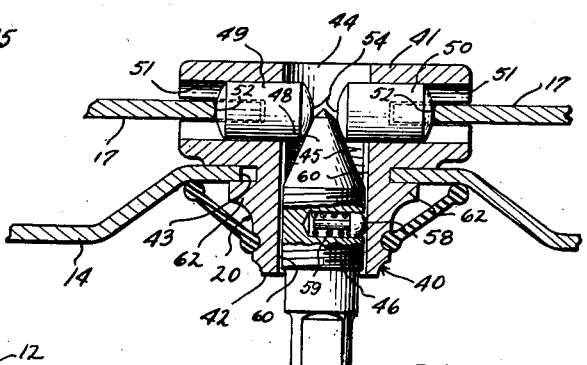
Figure 2:
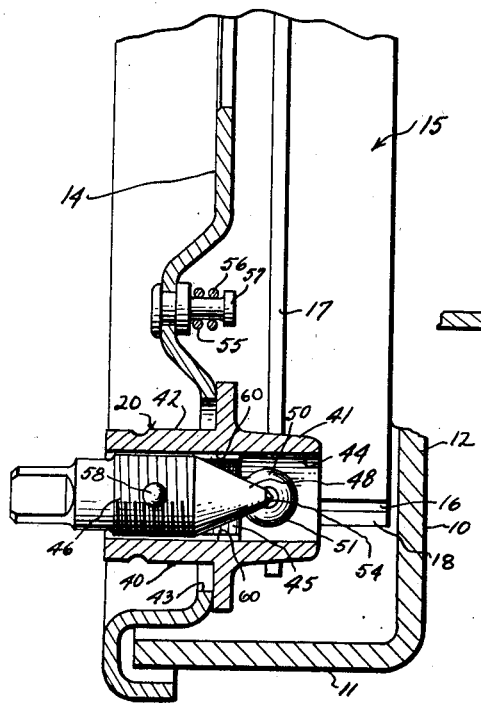

Upon reference to Figure 6, it will be noted that the line of action of the springs 55 and 56 is inclined from the shoes toward the backing plate so as to yieldably urge the edges of the shoes adjacent the backing plate toward the latter. In this connection, it will be noted that the axially extending portion 16 of the brake shoes is upset at opposite side edges thereof to provide circumferentially spaced axially extending projecting portions 65, and the backing plate 14 is fashioned to provide abutments 66 opposite the projections 65 on the adjacent edges of the shoes for engagement therewith to locate the brake shoes laterally in the brake drum. In the present instance, the shoes are held against the backing plate without binding at either the actuator or adjustment ends. As shown in Figure 7, binding at the adjustment ends of the shoes is prevented by providing substantial clearance in the bore 51 for axial adjustment of the shoes and binding at the actuator ends is prevented by providing a clearance between the link 29 and the rearwardmost abutment 26.

From the foregoing, it will be observed that I have provided a relatively simple, inexpensive brake mechanism embodying an improved adjustment device for adjusting the friction means relative to the brake flange and having actuating means of the linkage type so arranged that the point of connection of the linkage with the operating cable is not disturbed sufficiently during adjustment of the brake friction means to require an adjustment of the operating cable.

It will also be noted that the adjustment device is supported on the backing plate of the brake drum for limited circumferential movement relative to the drum in the direction of forward rotation and that the operating linkage permits this movement with the result that torque is transferred from the primary shoe to the secondary shoe through the adjustment device when the drum is rotating in a forward direction. In addition to the above, it will be noted that the operating linkage is so mounted that the leverage afforded thereby remains substantially uniform throughout brake application, although it is to be understood that the construction is highly flexible in that the linkage may be arranged to provide a receding leverage in the event it is desired to control the servo action of the brake.

What I claim as my invention is:

1. In brake mechanism, a revoluble brake drum having an annular brake flange, a backing plate for the drum, brake shoes supported upon the backing plate within the drum for engagement with the brake flange and having the ends thereof at one side of the drum spaced from each other circumferentially of the brake flange, an abutment extending from the backing plate between said ends of the brake shoes for engagement with the latter ends in the released position of the shoes, an actuator for the brake friction means comprising a lever having the radially outer end pivotally connected to one of said ends of the shoes at a point adjacent the brake flange, a link having one end pivotally connected to the lever adjacent its pivotal connection with the end aforesaid of said shoe and having the opposite end pivotally connected to the adjacent end of the other shoe, and adjustment means for swinging the shoes outwardly relative to the drum about said abutment, the points of pivotal connection of the linkage with the brake shoes being predeterminedly located with respect to the abutment to permit adjustment of the shoes relative to the brake flange without appreciably changing the location of the radially inner end of the lever in the released position of the brake shoes.

2. In brake mechanism, a revoluble brake drum having an annular brake flange, a backing plate for said drum, brake shoes supported upon the backing plate within the drum for engagement with the brake flange and having the opposite ends spaced from each other circumferentially of the brake flange, an abutment extending from the backing plate between the ends of the shoes at one side of the drum and engageable with said ends in the released position of the shoes, an actuator for the latter ends of the shoes comprising a lever having the radially outer end pivotally connected to the actuator end of one shoe adjacent the brake flange, a link having one end pivotally connected to the lever adjacent its pivotal connection with the actuator end of the shoe aforesaid and having the opposite end pivotally connected to the adjacent end of the other shoe, means for swinging said lever in a direction toward the direction of forward rotation of the brake drum including a member operatively connected to the radially inner end of the lever and extending in the last named direction, and adjustment means associated with the opposite ends of the shoes for swinging the latter outwardly relative to the brake drum about said abutment, the points of pivotal connection of the brake actuating linkage being predeterminedly positioned with respect to the abutment to provide full adjustment of the shoes without changing the location of the radially inner end of the lever sufficiently to necessitate a compensating adjustment of said member.

3. In brake mechanism, a revoluble brake drum having an annular brake flange, a backing plate for said drum, primary and secondary shoes supported upon the backing plate within the drum for engagement with the brake flange and having the opposite ends spaced from each other circumferentially of the brake flange, an abutment extending from the backing plate between the ends of the brake shoes at one side of the drum and engageable with said ends in the released position of the shoes, an actuator for the latter ends of the shoes comprising a lever having the radially outer end pivotally connected to the secondary shoe adjacent the brake flange, a link having one end pivotally connected to the lever adjacent its pivotal connection with the secondary shoe and having the opposite end pivotally connected to the primary shoe, an adjustment device supported upon the backing plate between the opposite ends of the shoes and engageable with the latter to swing said shoes outwardly about the abutment, and an operating member connected to the radially inner end of the lever and extending from the latter in the direction of forward rotation of the brake drum for swinging said lever in the latter direction, the locations of the pivotal connections of the brake actuator linkage being so located with respect to the abutment that full adjustment of the shoes is effected without changing the location of the connection of the radially inner end of the lever with the member sufficiently to necessitate adjusting the length of the member.

4. In brake mechanism, a revoluble brake drum having an annular brake flange, brake shoes supported within the drum for engagement with the brake flange and having the opposite ends spaced from each other circumferentially of the brake flange, an abutment extending between the ends of the shoes at one side of the drum and engageable with the latter ends of the shoes in the released position of the brake shoes, an actuator for the brake shoes comprising linkage interconnecting the abutment ends of the shoes and including a lever extending radially inwardly from the shoes, operating means connected to the radially inner end of the lever, and an adjustment device located between the opposite ends of the shoes and effective to swing the shoes outwardly relative to the brake drum about said abutment, said linkage being so arranged with respect to the abutment as to permit full adjustment of the brake shoes without changing the location of the radially inner end of the lever in the released position of the shoes sufficiently to necessitate a compensating adjustment of the operating means.

5. In brake mechanism, a revoluble brake drum having an annular brake flange, primary and secondary shoes supported within the drum for engagement with the brake flange and having the opposite ends spaced from each other circumferentially of the brake flange, an abutment extending between the ends of the brake shoes at one side of the drum and engageable with the latter ends in the released position of the shoes, an actuator for the last named ends of the brake shoes including a lever and a link respectively pivotally connected to the actuator ends of the shoes and pivotally connected together, an adjustment device located between the opposite ends of the shoes and effective to swing the shoes outwardly relative to the brake drum about the abutment, the locations of the pivotal connections of the actuator linkage being so arranged that a line passing through the centers of the pivots for the link forms substantially a chord of an arc connecting the ends of the friction means to provide substantially uniform leverage throughout brake application, and said pivots also being predeterminedly located with respect to the abutment to afford full adjustment of the brake shoes without changing the released positions of the linkage sufficiently to require a compensating adjustment of the latter.

6. In brake mechanism, a brake drum having an annular brake flange, a backing plate for the brake drum, brake shoes supported upon the backing plate within the drum for engagement with the brake flange and having the opposite ends spaced from each other circumferentially of the brake flange, retracting springs having the outer ends respectively connected to the shoes and having the inner ends connected to the backing plate at a point offset axially toward the backing plate from the points of connection of the springs with the shoes to provide for yieldably urging the edges of the shoes adjacent the backing plate into engagement with the latter, an abutment extending from the backing plate between the ends of the shoes at one side of the drum and engageable with said ends of the shoes, and an adjusting device supported upon the backing plate between the opposite ends of the shoes and engageable with the latter ends, both the abutment and adjustment device affording axial displacement of the shoes to provide for seating the shoes against the backing plate without danger of the ends of the shoes binding at either the abutment or the adjustment device.

7. In brake mechanism, a brake drum having an annular brake flange, a backing plate for the brake drum having circumferentially spaced seats, brake friction means supported on the backing plate within the drum for engagement w.th the brake flange and having spaced ends, said friction means also having portions projecting axially therefrom in registration with the seats on the backing plate for engagement with the latter seats, means normally urging the brake friction means axially toward the backing plate to effect engagement of the projections on the friction means with the seats on the backing plate, and an abutment extending from the backing plate between the ends of the friction means and engageable with said ends, said abutment having axially spaced shoulders at opposite sides of the ends of the friction means affording sufficient axial displacement of the friction means to permit effectively seating the friction means against the backing plate without danger of the ends of the friction means binding at the abutment.

FRANK L. MAIN.